US012590812B2

(12) United States Patent
Kinoshita et al.

(10) Patent No.: US 12,590,812 B2
(45) Date of Patent: Mar. 31, 2026

(54) IMAGE DISPLAY BASED ON PRESENT POSITION AND ACCESSIBILITY PRIORITY

(71) Applicant: PIONEER CORPORATION, Tokyo (JP)

(72) Inventors: Eisuke Kinoshita, Saitama (JP); Naoto Iwanaga, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 18/688,696

(22) PCT Filed: Jan. 14, 2022

(86) PCT No.: PCT/JP2022/001201
§ 371 (c)(1),
(2) Date: Mar. 1, 2024

(87) PCT Pub. No.: WO2023/135768
PCT Pub. Date: Jul. 20, 2023

(65) Prior Publication Data
US 2024/0393130 A1 Nov. 28, 2024

(51) Int. Cl.
*G01C 21/36* (2006.01)
(52) U.S. Cl.
CPC ..... *G01C 21/3676* (2013.01); *G01C 21/3647* (2013.01); *G01C 21/3682* (2013.01); *G01C 21/3697* (2013.01)
(58) Field of Classification Search
CPC ............ G01C 21/3676; G01C 21/3682; G01C 21/3697
See application file for complete search history.

(56) References Cited

U.S. PATENT DOCUMENTS

| | | | | |
|---|---|---|---|---|
| 6,401,034 B1 * | 6/2002 | Kaplan | .............. | G01C 21/3682 |
| | | | | 340/988 |
| 2002/0065605 A1 * | 5/2002 | Yokota | .............. | G01C 21/3682 |
| | | | | 340/995.22 |
| 2005/0251334 A1 * | 11/2005 | Mizuno | .............. | G01C 21/3682 |
| | | | | 701/533 |
| 2006/0247855 A1 * | 11/2006 | de Silva | ................. | G01C 21/36 |
| | | | | 701/454 |
| 2008/0232695 A1 * | 9/2008 | Noda | ...................... | G06F 16/54 |
| | | | | 382/305 |

(Continued)

FOREIGN PATENT DOCUMENTS

| | | |
|---|---|---|
| JP | 2012-017983 A | 1/2012 |
| JP | 2014-035613 A | 2/2014 |

(Continued)

OTHER PUBLICATIONS

Office Action issued in corresponding Japanese Patent Application No. 2023-573770, dated Oct. 15, 2024.

(Continued)

*Primary Examiner* — Dino Kujundzic
(74) *Attorney, Agent, or Firm* — Foley & Lardner LLP

(57) ABSTRACT

An information processing device includes an acquiring unit that acquires a present position of a movable object, and a display control unit that displays an image posted in a manner associated with position information in a map of a predetermined area including the present position based on the present position and priority according to accessibility from the present position.

17 Claims, 8 Drawing Sheets

(56) References Cited

U.S. PATENT DOCUMENTS

| | | | |
|---|---|---|---|
| 2009/0063040 A1* | 3/2009 | Schliermann | G01C 21/3605 |
| | | | 701/533 |
| 2009/0171570 A1* | 7/2009 | Chiba | G01C 21/3682 |
| | | | 701/532 |
| 2010/0169774 A1* | 7/2010 | Oda | G06F 3/0488 |
| | | | 715/702 |
| 2013/0317745 A1* | 11/2013 | Sano | G01C 21/3682 |
| | | | 701/533 |
| 2014/0067956 A1 | 3/2014 | Tsunoda et al. | |
| 2015/0134236 A1* | 5/2015 | Ukai | G01C 21/20 |
| | | | 701/410 |
| 2017/0199050 A1* | 7/2017 | Masuko | G06F 16/00 |
| 2017/0345197 A1* | 11/2017 | Sakai | G06T 11/60 |
| 2018/0112995 A1 | 4/2018 | Bortolussi et al. | |
| 2019/0018859 A1* | 1/2019 | Miyaoka | G06Q 50/10 |
| 2023/0273043 A1* | 8/2023 | Nishiyama | G01C 21/3461 |
| | | | 701/426 |

FOREIGN PATENT DOCUMENTS

| | | | |
|---|---|---|---|
| JP | 2014-052240 A | 3/2014 | |
| JP | 2014-135026 A | 7/2014 | |
| WO | WO-2010/052866 A1 | 5/2010 | |

OTHER PUBLICATIONS

Extended European Search Report for Application No. 22920293.2 dated Sep. 24, 2025.

* cited by examiner

FIG.8

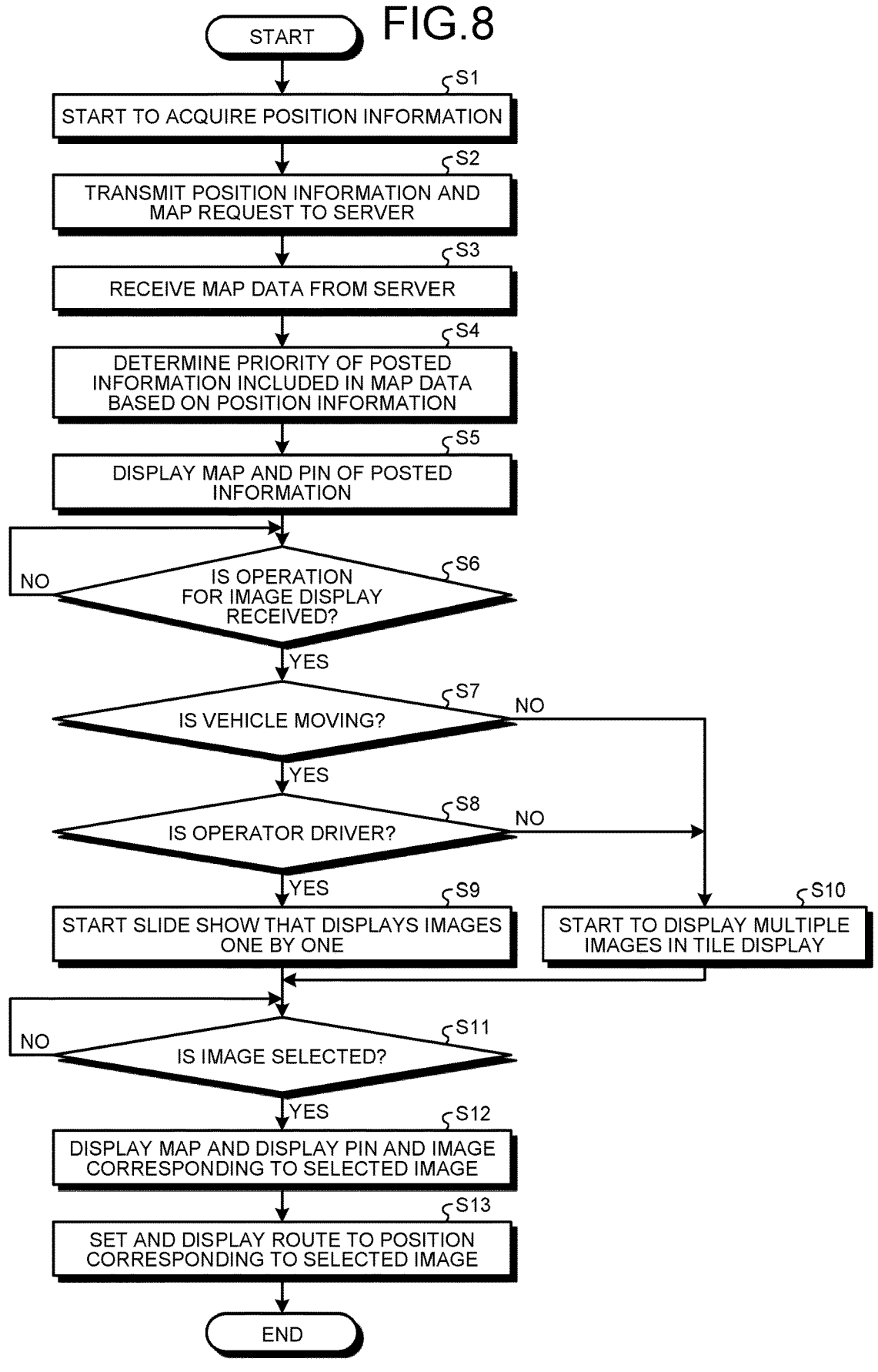

START

S1
START TO ACQUIRE POSITION INFORMATION

S2
TRANSMIT POSITION INFORMATION AND MAP REQUEST TO SERVER

S3
RECEIVE MAP DATA FROM SERVER

S4
DETERMINE PRIORITY OF POSTED INFORMATION INCLUDED IN MAP DATA BASED ON POSITION INFORMATION

S5
DISPLAY MAP AND PIN OF POSTED INFORMATION

S6
IS OPERATION FOR IMAGE DISPLAY RECEIVED?
NO
YES

S7
IS VEHICLE MOVING?
NO
YES

S8
IS OPERATOR DRIVER?
NO
YES

S9
START SLIDE SHOW THAT DISPLAYS IMAGES ONE BY ONE

S10
START TO DISPLAY MULTIPLE IMAGES IN TILE DISPLAY

S11
IS IMAGE SELECTED?
NO
YES

S12
DISPLAY MAP AND DISPLAY PIN AND IMAGE CORRESPONDING TO SELECTED IMAGE

S13
SET AND DISPLAY ROUTE TO POSITION CORRESPONDING TO SELECTED IMAGE

END

IMAGE DISPLAY BASED ON PRESENT POSITION AND ACCESSIBILITY PRIORITY

FIELD

The present disclosure relates to an information processing device, an information processing method, and an information processing program.

BACKGROUND

In recent years, icons of various facilities have been displayed on a map viewed using a smartphone and other devices. It has also been developed that posted information posted on a posting site is acquired by a portable terminal device and displayed on an in-vehicle device connected to the portable terminal device. In this case, a posting-related image is displayed at a position corresponding to the distance and direction with respect to the present position in a predetermined display region centered on the position corresponding to the present position on the display screen.

CITATION LIST

Patent Literature

Patent Literature 1: Japanese Patent Application Laid-open No. 2014-52240

SUMMARY

Technical Problem

However, if posting-related images around the present position are displayed at the positions corresponding to the distance and direction, images of less accessible places where a user has already passed and needs to go back the way he/she came to get, for example, may be displayed. In other words, images are displayed regardless of their accessibility as long as they are in a predetermined area from the present position. As a result, it is difficult to display images according to the accessibility from the present position.

The present disclosure provides an information processing device, an information processing method, and an information processing program that can display an image of a place easily accessible from the present position.

Solution to Problem

An information processing device includes: an acquiring unit configured to acquire a present position of a movable object; and a display control unit configured to display an image posted in a manner associated with position information in a map of a predetermined area including the present position based on the present position and priority according to accessibility from the present position.

An information processing method is performed by an information processing device, the information processing method including: a step of acquiring a present position of a movable object; and a step of display control of displaying an image posted in a manner associated with position information in a map of a predetermined area including the present position based on the present position and priority according to accessibility from the present position.

An information processing program causes an information processing device to perform: a step of acquiring a present position of a movable object; and a step of display control of displaying an image posted in a manner associated with position information in a map of a predetermined area including the present position based on the present position and priority according to accessibility from the present position.

BRIEF DESCRIPTION OF DRAWINGS

FIG. 8 is a flowchart of an example of display processing according to the present embodiment.

DESCRIPTION OF EMBODIMENTS

Figure 1:
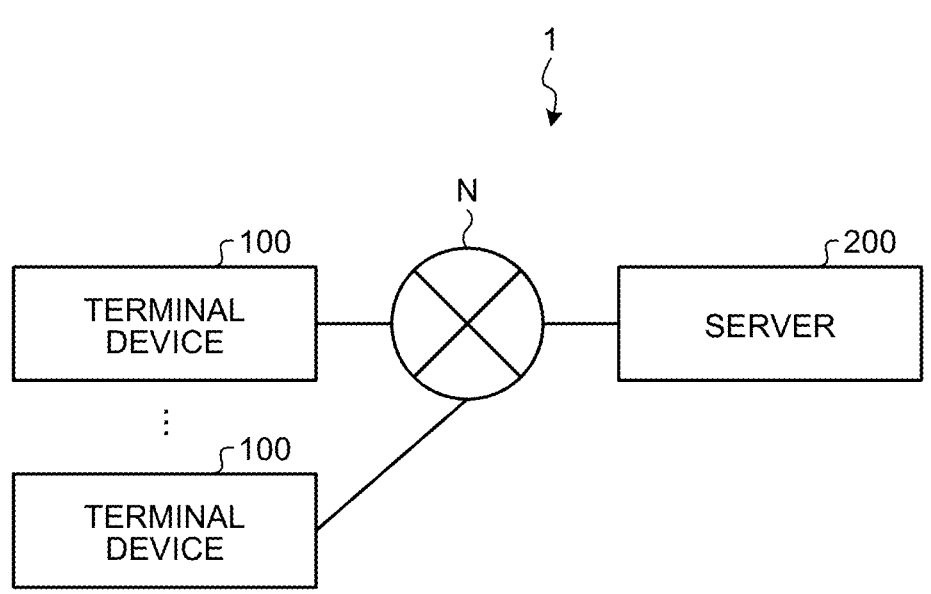
FIG. 1 is a diagram of an example of an information processing system according to an embodiment of the present disclosure.

Exemplary aspects (hereinafter referred to as embodiments) to embody the present disclosure are described below with reference to the drawings. The present disclosure is not limited by the embodiments described below. In the drawings, like parts are denoted by like reference numerals.

EMBODIMENTS

1. Configuration of Information Processing System

FIG. 1 is a diagram of an example of an information processing system according to an embodiment of the present disclosure. As illustrated in FIG. 1, an information processing system 1 includes terminal devices 100 and a server 200. While two terminal devices 100 are illustrated in FIG. 1 as representatives of a plurality of terminal devices 100, the number of terminal devices 100 is not limited, and the information processing system 1 may include any number of terminal devices 100.

The terminal device 100 and the server 200 are mutually communicatively connected via a network N. The network N can be any type of communication network, whether wired or wireless, including the Internet, a local area network (LAN), a virtual private network (VPN), and other networks.

The information processing system 1 provides a service to display, on a map, an image and other data associated with position information posted from the terminal device 100 or the like of each user. The information processing system 1, for example, displays pins corresponding to images on the map. When a pin is selected, detailed information, such as an image, is displayed. The information processing system 1 also provides a navigation service on the terminal device 100. The information processing system 1, for example, displays pins corresponding to images on the map. When a pin is selected, a route to the position of the pin is set and displayed.

The terminal device 100 acquires the present position of a movable object (e.g., a vehicle) in which the user carrying the terminal device 100 is riding. The terminal device 100 transmits the acquired present position to the server 200 and receives a map of a predetermined area including the present position and posted information. The terminal device 100 displays an image posted in a manner associated with the position information in the map of the predetermined area including the present position based on the present position and the priority according to the accessibility from the present position. The terminal device 100, for example, displays an image posted at a position in the traveling direction from the present position with higher priority than an image posted at a position in the direction opposite to the traveling direction.

2. Configuration of Terminal Device

Figure 2:
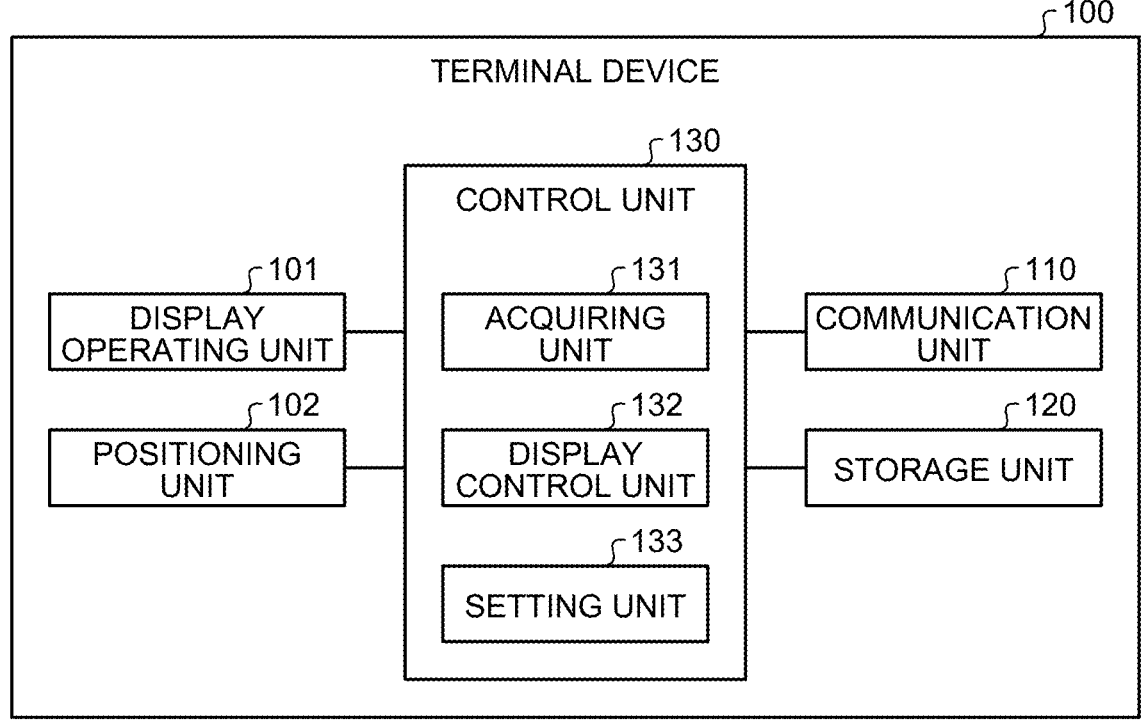
FIG. 2 is a diagram of an example of the configuration of a terminal device according to the present embodiment.

FIG. 2 is a diagram of an example of the configuration of the terminal device according to the present embodiment. As illustrated in FIG. 2, the terminal device 100 includes a display operating unit 101, a positioning unit 102, a communication unit 110, a storage unit 120, and a control unit 130. Besides the functional units illustrated in FIG. 2, the terminal device 100 may also include various functional units included in known computers, such as various input devices and voice output devices. Examples of the terminal device 100 include, but are not limited to, smartphones, tablet terminals, etc. The terminal device 100 is an example of an information processing device.

The display operating unit 101 is a display 25 device that displays various kinds of information and an input device that receives various operations from the user. The display operating unit 101 is implemented by a liquid crystal display or an organic electroluminescence (EL) display as a display device, for example. The display operating unit 101 is implemented by a touch panel as an input device, for example. In other words, the display operating unit 101 is a unit in which the display device and the input device is integrated. The display operating unit 101 outputs the operations input by the user to the control unit 130 as operating information. The display operating unit 101 may be a unit in which the display device and the input device are separately provided.

The positioning unit 102 receives signals from a satellite positioning system. The positioning unit 102 performs positioning by receiving signals from the global positioning system (GPS), the global navigation satellite system (GLONASS), and a global navigation satellite system, such as Galileo, as the satellite positioning system. When the positioning unit 102 is requested to perform positioning by the control unit 130, the positioning unit 102 performs positioning and outputs the positioning results as position information based on a geodetic system, such as the world geodetic system (WGS) 84. When the positioning unit 102 is requested to continue positioning by the control unit 130, the positioning unit 102 continuously performs positioning and continues to output the position information until when it is requested to stop positioning by the control unit 130. The positioning unit 102 may receive signals from a regional navigation satellite system, such as the quasi-zenith satellite system, as the satellite positioning system.

The communication unit 110 is implemented by a communication module corresponding to a wireless local area network (LAN), such as Wi-Fi (registered trademark), or third to fifth generation mobile communication systems (3G to 5G), for example. The communication unit 110 is connected to the network N via a wireless base station, which is not illustrated. In other words, the communication unit 110 is a communication interface that is wirelessly connected to the server 200 via the network N and controls the communications of information to and from the server 200. When the communication unit 110 receives map data, updated data, and other data from the server 200, the communication unit 110 outputs the received map data, updated data, and other data to the control unit 130. When the communication unit 110 receives position information, a map request, and other data from the control unit 130, the communication unit 110 transmits the received position information, map request, and other data to the server 200.

The storage unit 120 is implemented by, for example, a semiconductor memory element, such as a random-access memory (RAM) and a flash memory, or a storage device, such as a hard disk and an optical disc. The storage unit 120 stores therein the position information or the like obtained by positioning by the positioning unit 102, for example. The storage unit 120 also stores therein information (computer programs and data) used for the processing in the control unit 130.

The control unit 130 is implemented by a central processing unit (CPU) or a micro processing unit (MPU) executing a computer program stored in an internal storage device using the RAM as the work area, for example. The control unit 130 may be implemented by an integrated circuit, such as an application specific integrated circuit (ASIC) and a field programmable gate array (FPGA).

The control unit 130 includes an acquiring unit 131, a display control unit 132, and a setting unit 133, and implements or performs the functions and the actions of information processing, which will be described later. The internal configuration of the control unit 130 is not limited to the configuration illustrated in FIG. 2 and may be other configurations as long as it performs the information processing, which will be described later. In addition, the control unit 130 executes various applications, such as a navigation application.

When the navigation application is started by the user, the acquiring unit 131 starts to acquire the position information from the positioning unit 102. The acquiring unit 131 transmits the acquired position information and a map request to request map data on a predetermined area including the acquired position information (present position) from the server 200 to the server 200 via the communication unit 110 and the network N. The acquiring unit 131 also transmits a map request to acquire data to be required with the movement of the vehicle (movable object) in which the user carrying the terminal device 100 is riding to the server 200 via the communication unit 110 and the network N. When the navigation application is terminated by the user, the acquiring unit 131 stops acquiring the position information from the positioning unit 102.

The acquiring unit 131 receives map data on the predetermined area from the server 200 via the network N and the communication unit 110. The acquiring unit 131 also receives update data of the map from the server 200 via the network N and the communication unit 110. The map data and the update data received from the server 200 include posted information posted by each user. The posted information includes an image, position information associated with the image, and a tag, for example. The acquiring unit 131 outputs the map data or the update data to the display control unit 132.

When the display control unit 132 receives the map data or the update data from the acquiring unit 131, the display control unit 132 determines the priority of the posted information based on its own position information and the position information included in the posted information. The priority of the posted information can be determined such that a place more easily accessible from the present position is given higher priority. The display control unit 132, for example, gives higher priority to the posted information (image) associated with the position information in a specific range in the traveling direction of the vehicle (movable object). The specific range can be set to a range where the vehicle can reach within a predetermined time (e.g., 30 minutes) in the traveling direction of the vehicle, for example.

If a route from the present position to the position indicated by the position information associated with the image of the posted information is set, the posted information (image) with fewer right and left turns may be given higher priority, for example. Alternatively, the posted information (image) with fewer right turns than left turns on the route may be given higher priority, for example. The route can be set by the setting unit 133, which will be described later.

The posted information (image) with later posting date and time may be given higher priority, for example. If a route from the present position to a destination is set, the posted information (image) may be given higher priority in order of proximity to the route to the destination, for example. The posted information (image) associated with the position information corresponding to a detour from the route to the destination may be given lower priority.

If map data is input from the acquiring unit 131, the display control unit 132 determines the priority of the posted information and displays map data in a predetermined area on the display operating unit 101 as a map screen. If update data is input from the acquiring unit 131, the display control unit 132 displays a map screen obtained by updating the map screen being displayed on the display operating unit 101 with the update data. In other words, the predetermined area of the map data is the area of the map being displayed or the area of the map displayed using the update data after the vehicle (movable object) starts to move.

The display control unit 132 also displays a pin corresponding to the posted information at the position corresponding to the position information of the posted information on the map screen. The object indicating the posted information displayed on the map screen is not limited to a pin and may be a thumbnail image or the like.

When the display control unit 132 displays the map and the pin of the posted information, the display control unit 132 determines whether it has received an operation for image display. The operation for image display is received by selecting an icon displayed on the map screen, for example. If the display control unit 132 determines that it has not received an operation for image display, the display control unit 132 waits for receiving an operation for screen display on the map screen. By contrast, if the display control unit 132 determines that it has received an operation for image display, the display control unit 132 determines whether the vehicle (movable object) is moving based on the history of its own position information. As to the determination whether the vehicle is moving, when the vehicle continues to stop for a certain period of time, such as being parked in a parking lot or on the shoulder of a road, the display control unit 132 can determine that the vehicle is not moving based on the stopping time and its own position information. In other words, the display control unit 132 may determine that the vehicle is moving if the vehicle is in a stop state where the vehicle will immediately start to move, such as waiting at a traffic light.

If the display control unit 132 determines that the vehicle is moving, it determines whether the operator of the terminal device 100 is the driver. The display control unit 132 refers to information obtained by causing the user to select in advance whether the operator is the driver when the navigation application is started, for example. If the user of the terminal device 100 is the driver, but a person in the passenger seat operates the terminal device 100, it can be selected that the operator is not the driver. If the display control unit 132 determines that the operator is the driver, it switches the map screen being displayed on the display operating unit 101 to a slideshow screen that displays the images of the posted information one by one and starts a slide show. The slide show is displayed in descending order of the determined priority of the posted information.

By contrast, if the display control unit 132 determines that the vehicle is not moving or that the operator is not the driver, it switches the map screen being displayed on the display operating unit 101 to a tile display screen that displays the images of a plurality of pieces of posted information positioned on the map screen in tile display (grid view display). In other words, the display control unit 132 displays the images one by one when the vehicle is moving and displays a plurality of images in tile display when the vehicle is stopped. If the operator is not the driver of the vehicle, the display control unit 132 displays a plurality of images in tile display when the vehicle is moving.

In the tile display screen, the images in tile display are arranged according to the determined priority of the posted information. The display control unit 132 displays a plurality of images in tile display in descending order of priority from the top, for example. Alternatively, the display control unit 132 may set the present position at the center in tile display and display a plurality of images from the center outward in descending order of priority, for example. Still alternatively, the display control unit 132 may lower the priority of an image associated with the position information in the direction opposite to the traveling direction of the vehicle and display the image so as to move it to the bottom in tile display, for example.

Furthermore, the display control unit 132 may change the images displayed in tile display according to the present position of the vehicle. In other words, the tile display screen may change the displayed images or the arrangement of the displayed images as the vehicle moves. Specifically, the tile display screen may display the photos (images) of surrounding spots and scenery in a manner replaced from time to time as the vehicle moves.

The display control unit 132 determines whether an image is selected on the slideshow screen or the tile display screen. If the display control unit 132 determines that no image is selected, the display control unit 132 waits for selection of an image. By contrast, if the display control unit 132 determines that an image is selected, the display control unit 132 switches the screen to the map screen and displays the map of the area including the present position. In other words, when a displayed image is selected on the slideshow screen or the tile display screen, the display control unit 132 displays the map of the area including the present position.

The display control unit 132 displays a pin at the position indicated by the position information associated with the selected image and displays the selected image near the pin. When displaying the map of the predetermined area on the map screen, the display control unit 132 may vary the pin (mark) representing the position indicated by the position information associated with the selected image according to the priority. For example, the display control unit 132 may display the color of the pin darker for higher priority and lighter for lower priority. The display control unit 132 may vary not only the color of the pin but also the shape of the pin, for example. When the display control unit 132 displays the pin and the image on the map, the display control unit 132 outputs an instruction to set a route to the position of the pin to the setting unit 133. The route setting instruction includes the position information (position information on the pin) associated with the selected image. If the display control unit 132 does not set the route to the position of the pin, the display control unit 132 may wait for an operation by the user without outputting the route setting instruction to the setting unit 133. When a back operation is performed on the slideshow screen or the tile display screen, the display control unit 132 switches the screen to the map screen.

When the setting unit 133 receives the route setting instruction from the display control unit 132, the setting unit 133 sets the route from the present position to the position corresponding to the selected image, that is, to the position indicated by the position information on the pin based on the acquired map data. In other words, the setting unit 133 sets the route from the present position to the position indicated by the position information associated with the selected image on the displayed map. If the map data is insufficient to set the route, the setting unit 133 transmits a map request for required map data to the server 200 and receives and acquires the required map data from the server 200. The setting unit 133 displays the set route on the map screen. When the setting unit 133 receives an instruction to start guidance from the operator, the setting unit 133 starts navigation on the set route.

Figure 3:
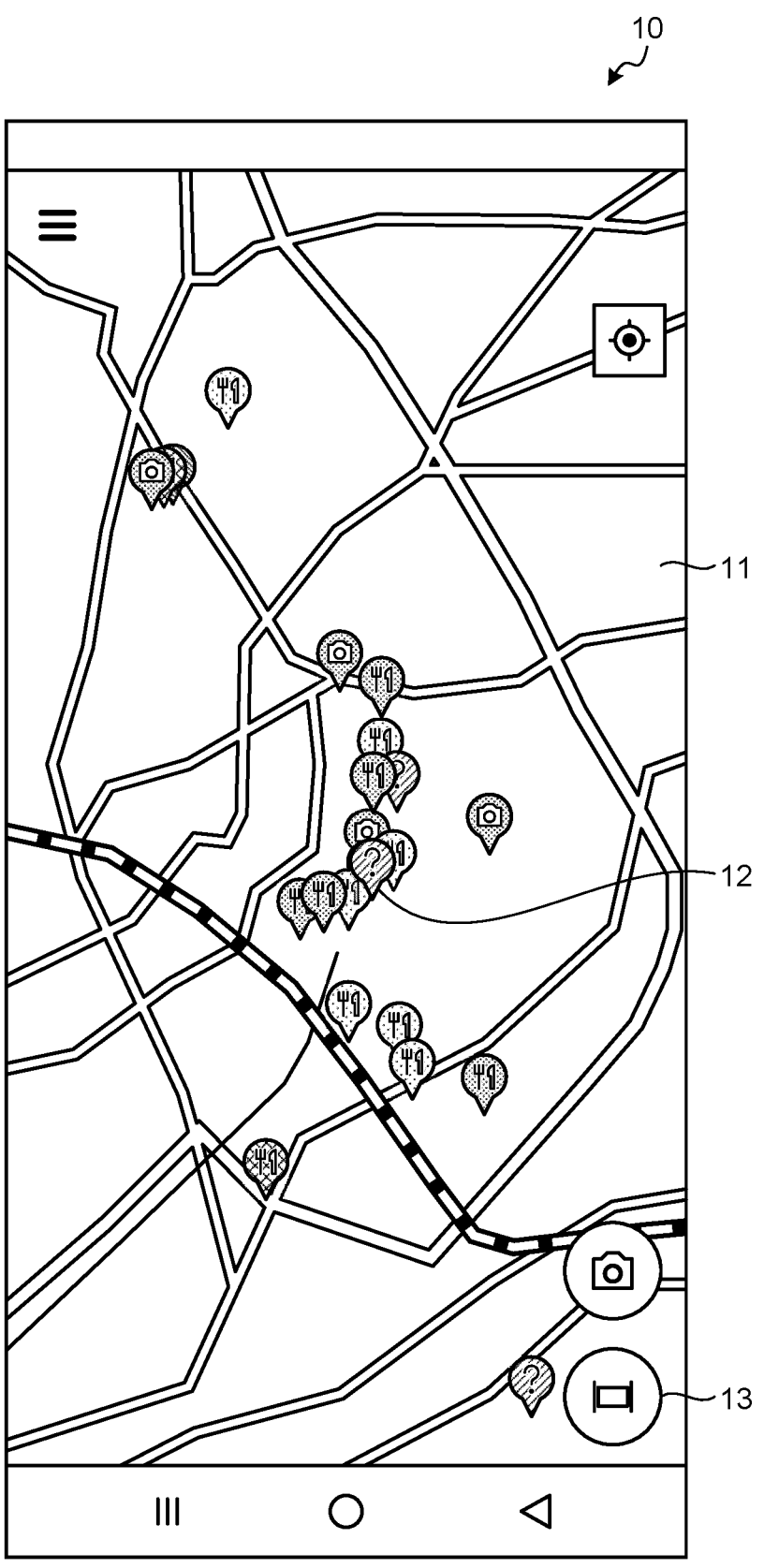
FIG. 3 is a view of an example of a map screen according to the present embodiment.

The following describes the transition from the map screen, to the slideshow screen and to the route display screen, and from the tile display screen to the route display screen with reference to FIGS. 3 to 6. FIG. 3 is a view of an example of the map screen according to the present embodiment. As illustrated in FIG. 3, a map screen 10 displays a map 11, and a plurality of pins 12 corresponding to the posted information are displayed on the map 11. The pins 12 may be displayed in gradation such that the pins 12 with later posting date and time have a darker color and that those with older posting date and time have a lighter color, for example. In other words, the map screen 10 may display the posted information on the map 11 such that the operator can readily found out the chronological order of the posting date and time. Alternatively, the pins 12 may be color-coded according to the time required from the present position to the positions of the respective pins 12. The map screen 10 also displays a button 13 for receiving an operation for image display. When the button 13 is pressed (touched) by the operator, the screen switches from the map screen to the slideshow screen or the tile display screen.

Figure 4:
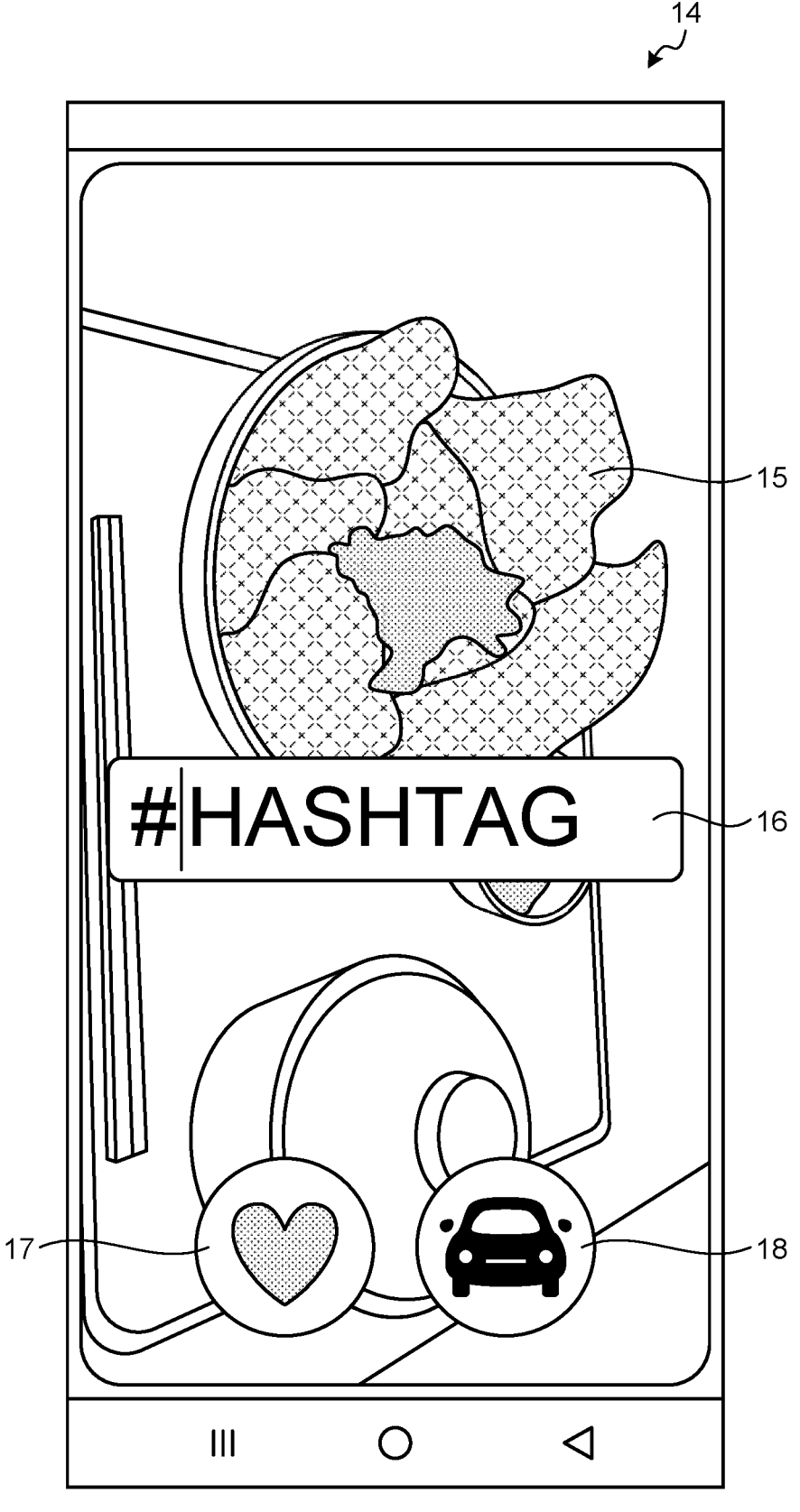
FIG. 4 is a view of an example of a slideshow screen according to the present embodiment.

FIG. 4 is a view of an example of the slideshow screen according to the present embodiment. As illustrated in FIG. 4, a slideshow screen 14 displays an image 15, a tag 16, a registration button 17, and a search button 18. The image 15 is an image being displayed as a slide show. The tag 16 is a tag associated with the image 15. The registration button 17 is a button for registering the displayed image 15 as a favorite image. The search button 18 is a button for searching for a route to the position indicated by the position information associated with the image 15. To search for a route to the position indicated by the position information associated with the image 15, the search button 18 is pressed on the slideshow screen 14 to select the image 15 being displayed, and the screen is switched to the route display screen.

Figure 5:
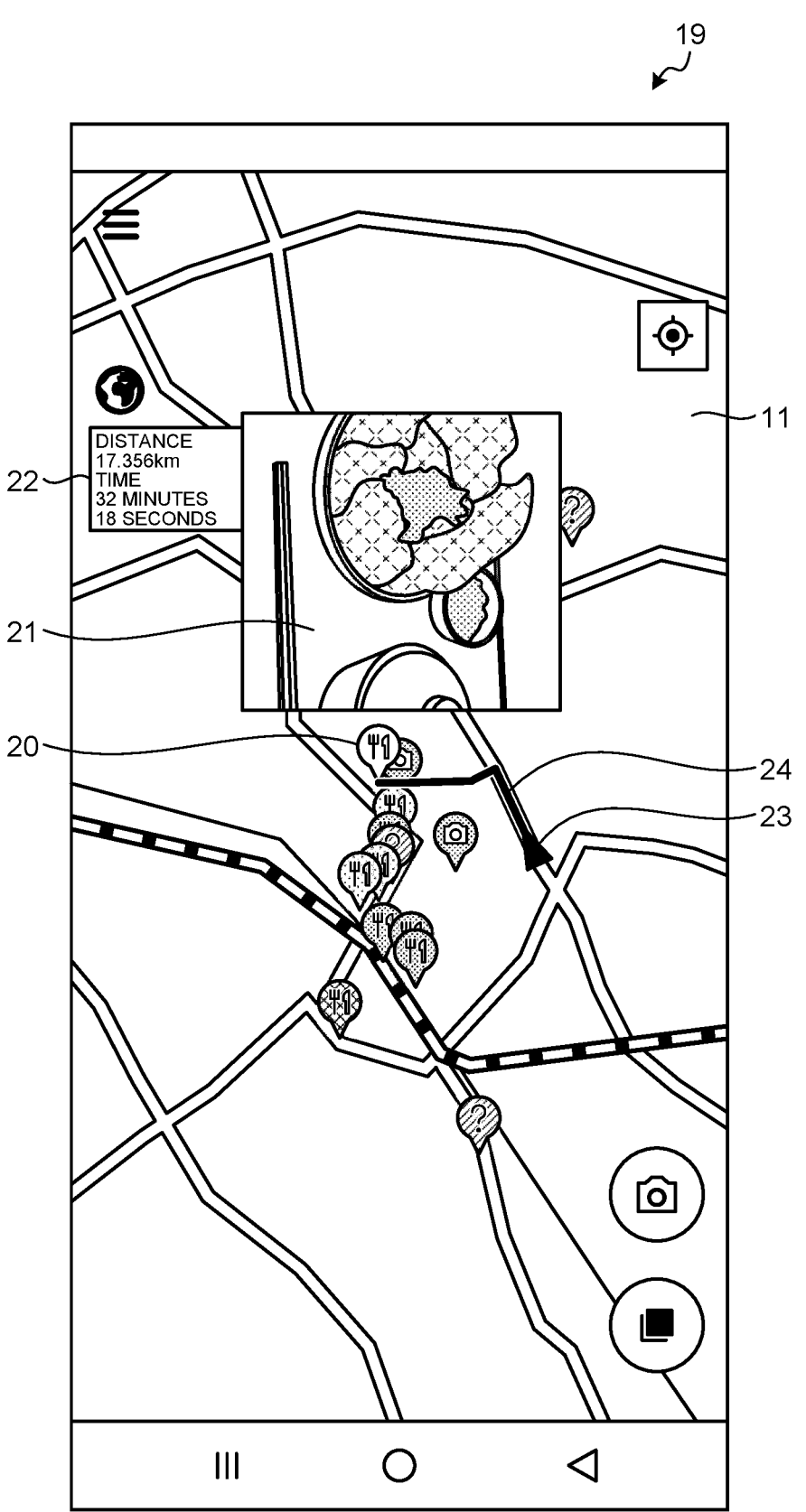
FIG. 5 is a view of an example of a route display screen according to the present embodiment.

FIG. 5 is a view of an example of the route display screen according to the present embodiment. As illustrated in FIG. 5, a route display screen 19 displays the map 11, and a pin 20, an image 21, route information 22, an icon 23, and a route 24 are displayed on the map 11. The pin 20 is a mark representing the position indicated by the position information associated with the image 15 selected on the slideshow screen 14. The image 21 is a reduced image of the image 15 on the slideshow screen. The route information 22 indicates the distance and time from the present position indicated by the icon 23 to the pin 20. The icon 23 is an icon indicating the present position of the terminal device 100. The route 24 indicates the retrieved route from the icon 23 to the pin 20.

Figure 6:
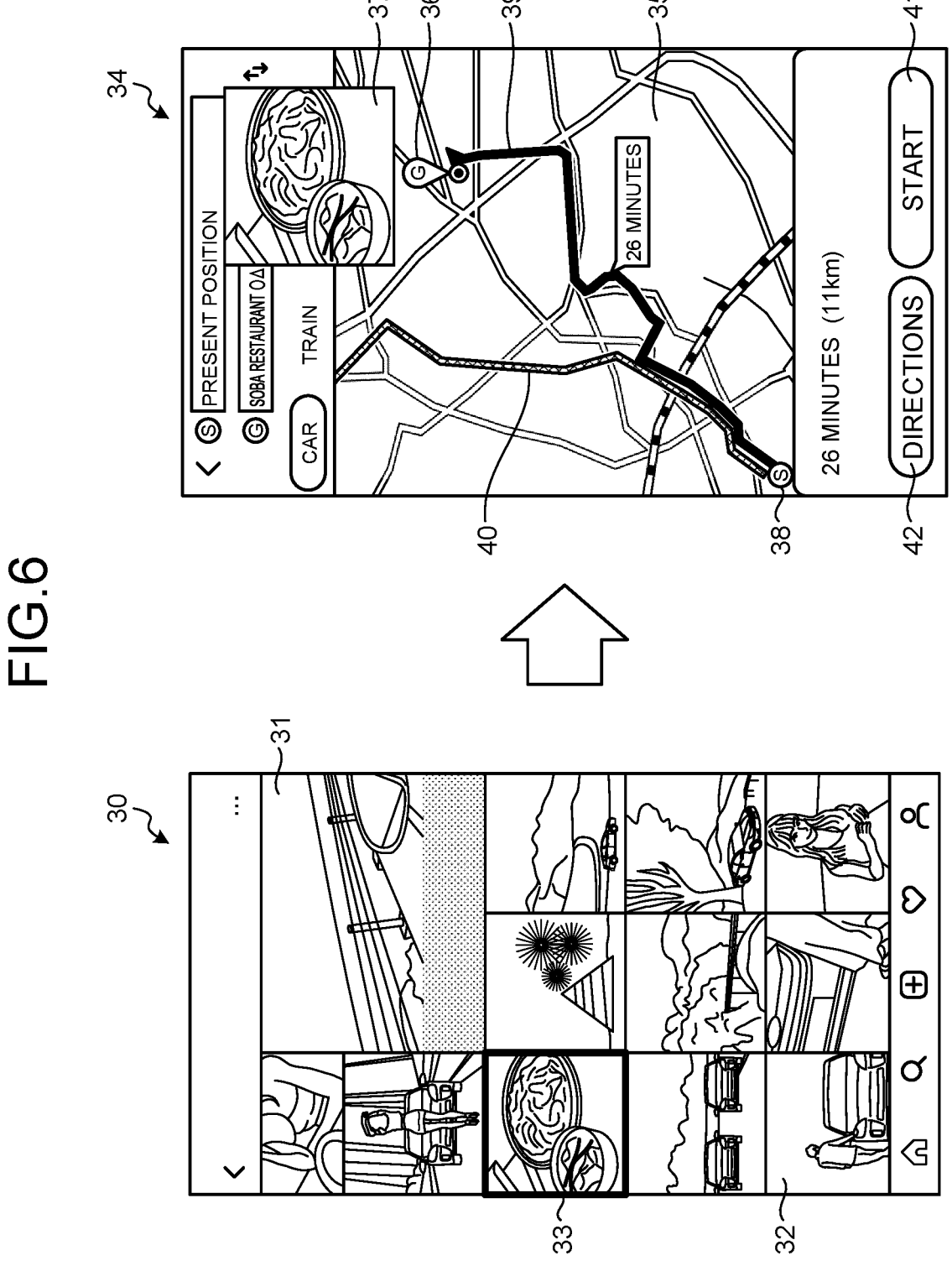
FIG. 6 is a view of an example of transition from a tile display screen to the route display screen according to the present embodiment.

FIG. 6 is a view of an example of transition from the tile display screen to the route display screen according to the present embodiment. As illustrated in FIG. 6, a tile display screen 30 displays a plurality of images from the top to the bottom of the screen in order descending of priority of the posted information, for example. In the tile display screen 30, an image 31 is the image with the highest priority. An image 32 is the image with the lowest priority out of the images of the posted information included in the map of the predetermined area. When an image 33 is pressed (touched) and selected on the tile display screen 30, for example, the screen is switched to a route display screen 34. Before the transition to the tile display screen 30, a route display screen similar to the route display screen 34 is displayed, and a route 40, which will be described later, is set in advance. Therefore, the images displayed on the tile display screen 30 may be images of the neighborhood of the route 40 or images of places easy to stop by from the route 40.

The route display screen 34 displays a map 35, and a pin 36, an image 37, an icon 38, a route 39, and the route 40 are displayed on the map 35. A start button 41 and a directions button 42 are displayed at the lower part of the map 35. The pin 36 is a mark representing the position indicated by the position information associated with the image 33 selected on the tile display screen 30. The image 37 is the same image as the image 33 or a reduced image of the image 33. The icon 38 is an icon indicating the present position of the terminal device 100. The route 39 indicates the retrieved route from the icon 38 to the pin 36. The route 40 indicates the route set before the image 33 is selected on the tile display screen 30.

The route display screen 34 displays the route 39 branching off to the place indicated by the pin 36 as a new route for the vehicle moving along the route 40. The start button 41 is a button that is pressed to start navigation along the route 39. The directions button 42 is a button that is pressed to display the directions on the route 39.

3. Configuration of Server

Figure 7:
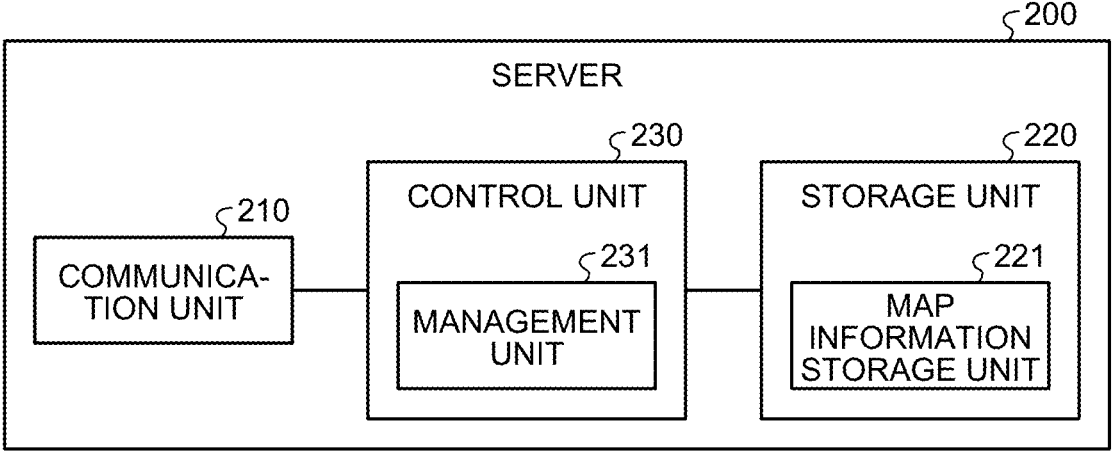
FIG. 7 is a diagram of an example of the configuration of a server according to the present embodiment.

Next, the configuration of the server 200 is described with reference to FIG. 7. FIG. 7 is a diagram of an example of the configuration of the server according to the present embodiment. As illustrated in FIG. 7, the server 200 includes a communication unit 210, a storage unit 220, and a control unit 230. Besides the functional units illustrated in FIG. 7, the server 200 may also include various functional units included in known computers, such as various input devices and voice output devices.

The communication unit 210 is implemented by a network interface card (NIC), for example. The communication unit 210 is a communication interface that is wiredly or wirelessly connected to the terminal device 100 via the network N and controls the communications of information to and from the terminal device 100. When the communication unit 210 receives position information, a map request, and other data from the terminal device 100, the communication unit 210 outputs the received position information, map request, and other data to the control unit 230. When the communication unit 210 receives map data, updated data, and other data from the control unit 230, the communication unit 210 transmits the received map data, updated data, and other data to the terminal device 100.

The storage unit 220 is implemented by, for example, a semiconductor memory element, such as a RAM and a flash memory, or a storage device, such as a hard disk and an optical disc. The storage unit 220 includes a map information storage unit 221. The storage unit 220 also stores therein information (computer programs and data) used for the processing in the control unit 230.

The map information storage unit 221 stores therein the map data and the posted information. In other words, the map information storage unit 221 stores therein various kinds of information, such as images and text including the position information posted on the map, in a manner associated with the map data.

The control unit 230 is implemented by a CPU or an MPU executing a computer program stored in an internal storage device using the RAM as the work area, for example. The control unit 230 may be implemented by an integrated circuit, such as ASIC and FPGA. The control unit 230 includes a management unit 231 and implements or performs the functions and the actions of information processing, which will be described later. The internal configuration of the control unit 230 is not limited to the configuration illustrated in FIG. 7 and may be other configurations as long as it is configured to perform the information processing described below.

The management unit 231 manages the map data stored in the map information storage unit 221 and the posted information posted on the map. When the management unit 231 receives position information and a map request from the terminal device 100 via the network N and the communication unit 210, the management unit 231 acquires the map data corresponding to the received position information and map request from the map information storage unit 221. The acquired map data also includes the posted information. The management unit 231 transmits the acquired map data to the terminal device 100 via the communication unit 210 and the network N.

4. Procedure of Information Processing

The following describes the series of display processing from the map screen to the route setting with reference to FIG. 8. FIG. 8 is a flowchart of an example of display processing according to the present embodiment.

When the navigation application is started by the user, the acquiring unit 131 of the terminal device 100 starts to acquire position information from the positioning unit 102 (Step S1). The acquiring unit 131 transmits the acquired position information and a map request to the server 200 (Step S2).

When the management unit 231 of the server 200 receives the position information and the map request from the terminal device 100, the management unit 231 acquires the map data corresponding to the received position information and the map request from the map information storage unit 221. The management unit 231 transmits the acquired map data to the terminal device 100. The acquiring unit 131 of the terminal device 100 receives the map data on a predetermined area from the server 200 (Step S3). The acquiring unit 131 outputs the map data to the display control unit 132.

When the display control unit 132 receives the map data from the acquiring unit 131, the display control unit 132 determines the priority of the posted information included in the map data based on its own position information and the position information included in the posted information (Step S4). When the display control unit 132 determines the priority of the posted information, the display control unit 132 displays a map of the predetermined area and a pin of the posted information on the display operating unit 101 (Step S5).

When the display control unit 132 displays the map and the pin of the posted information, the display control unit 132 determines whether it has received an operation for image display (Step S6). If the display control unit 132 determines that it has not received an operation for image display (No at Step S6), the display control unit 132 repeats the determination at Step S6. By contrast, if the display control unit 132 determines that it has received an operation for image display (Yes at Step S6), the display control unit 132 determines whether the vehicle is moving (Step S7).

If the display control unit 132 determines that the vehicle is moving (Yes at Step S7), the display control unit 132 determines whether the operator of the terminal device 100 is the driver (Step S8). If the display control unit 132 determines that the operator is the driver (Yes at Step S8), the display control unit 132 starts a slide show that displays images one by one (Step S9).

By contrast, if the display control unit 132 determines that the vehicle is not moving (No at Step S7) or that the operator is not the driver (No at Step S8), the display control unit 132 starts to display a plurality of images in tile display (Step S10). The display control unit 132 determines whether an image is selected on the slideshow screen or the tile display screen (Step S11). If the display control unit 132 determines that no image is selected (No at Step S11), the display control unit 132 repeats the determination at Step S11.

By contrast, if the display control unit 132 determines that an image is selected (Yes at Step S11), it switches the screen to the map screen and displays a map of the area including the present position. The display control unit 132 displays the pin and the image corresponding to the selected image (Step S12). When the display control unit 132 displays the pin and the image on the map, the display control unit 132 outputs an instruction to set a route to the position of the pin to the setting unit 133.

When the setting unit 133 receives a route setting instruction from the display control unit 132, the setting unit 133 sets a route from the present position to the position indicated by the position information associated with the selected image and displays the route on the map screen (Step S13). As a result, the terminal device 100 can display the image of the place easily accessible from the present position. In other words, the terminal device 100 can prevent the user who finds a store with a nice image from feeling unwilling to get there because it is too far away.

5. Modifications

The processing according to the embodiment described above may be performed in a variety of different aspects besides the embodiment described above.

In the embodiment described above, while the terminal device 100 performs the navigation after the image is selected, it is not limited thereto. Let us assume a case where a navigation device, which is not illustrated, is mounted on the vehicle and can communicate with the terminal device 100, for example. In this case, the terminal device 100 may transmit the image selected on itself and the position information on the image to the navigation device as a destination, and the navigation device may search for a route to the destination and perform the navigation.

In the embodiment described above, while the tile display screen 30 displays the images of the neighborhood of the route 40 or the images of places easy to stop by from the route 40, it is not limited thereto. If a route (guide route) from the starting point to the destination is set, for example, a plurality of images displayed on the tile display screen 30 may be a list of images easily accessible according to the travel on the route. In other words, waypoints may be proposed by the images. For example, images near the starting point of the route may be displayed at the upper part of the tile display screen 30, and images near the destination are displayed at the lower part of the tile display screen 30. In this case, the displayed images may be automatically scrolled according to the travel on the route. Furthermore, the images of easily accessible points and the images of less accessible points may be displayed such that they can be readily distinguished from each other by marking the image most accessible from the present position or graying out the images that have been already passed and become less accessible according to the travel on the route, for example.

6. Advantageous Effects

As described above, according to the present embodiment, the terminal device 100 includes the acquiring unit 131 and the display control unit 132. The acquiring unit 131 acquires the present position of the movable object. The display control unit 132 displays an image posted in a manner associated with the position information in the map of the predetermined area including the present position based on the present position and the priority according to the accessibility from the present position. As a result, the terminal device 100 can display the image of a place easily accessible from the present position.

According to the present embodiment, the predetermined area is the area of the map being displayed or the area of the map displayed after the movable object starts to move. As a result, the terminal device 100 can display the image of a place included in the area easily accessible from the present position.

According to the present embodiment, the display control unit 132 displays an image associated with the position information in a specific range in the traveling direction of the movable object as an image with high priority. As a result, the terminal device 100 can display the image of a place located in the traveling direction from the present position.

According to the present embodiment, the display control unit 132 displays an image with fewer right and left turns on the route from the present position to the position indicated by the position information associated with the image as an image with high priority. As a result, the terminal device 100 can display the image of a place more easily accessible from the present position.

According to the present embodiment, the display control unit 132 displays an image with fewer right turns than left turns on the route as an image with high priority. As a result, the terminal device 100 can display the image of a place more easily accessible from the present position.

According to the present embodiment, the display control unit 132 displays an image with late posting date and time as an image with high priority. As a result, the terminal device 100 can preferentially display a new image.

According to the present embodiment, if a route from the present position to a destination is set, the display control unit 132 displays an image in order of proximity to the route to the destination as an image with high priority. As a result, the terminal device 100 can display the image of a place easy to stop by.

According to the present embodiment, the display control unit 132 displays an image associated with the position information corresponding to a detour from the route to the destination by lowering the priority of the image. As a result, the terminal device 100 can prevent the user from feeling unwilling to get to the place of the image because it is too far away.

According to the present embodiment, the display control unit 132 displays images one by one when the movable object is moving, and displays a plurality of images in tile display when the movable object is stopped. As a result, the terminal device 100 can adjust the number of images presented at a time according to the movement of the movable object.

According to the present embodiment, the movable object is a vehicle, and the display control unit 132 displays, when the operator is not the driver of the vehicle, a plurality of images in tile display when the vehicle is moving. As a result, the terminal device 100 can display more images for a person in the passenger seat or other seats.

According to the present embodiment, the display control unit 132 displays a plurality of images in tile display in descending order of priority from the top. As a result, the terminal device 100 can preferentially display the images of places more easily accessible from the present position.

According to the present embodiment, the display control unit 132 sets the present position at the center in tile display and displays a plurality of images from the center outward in descending order of priority. As a result, the terminal device 100 can preferentially display the images of places more easily accessible from the present position.

According to the present embodiment, the display control unit 132 lowers the priority of an image associated with the position information in the direction opposite to the traveling direction of the movable object and displays the image so as to move it to the bottom in tile display. As a result, the terminal device 100 can update and display the image of a place easily accessible from the present position according to the movement of the movable object.

According to the present embodiment, the display control unit 132 changes the images displayed in tile display according to the present position of the movable object. As a result, the terminal device 100 can update and display the image of a place easily accessible from the present position according to the movement of the movable object.

According to the present embodiment, when displaying the map of the predetermined area, the display control unit 132 varies the mark representing the position indicated by the position information associated with the image according to the priority. As a result, the terminal device 100 can display the map such that the operator can readily find out a place easily accessible from the present position.

According to the present embodiment, when a displayed image is selected, the display control unit 132 displays a map of the area including the present position.

The terminal device 100 further includes the setting unit 133. The setting unit 133 sets a route from the present position to the position indicated by the position information associated with the selected image on the displayed map. As a result, the terminal device 100 can readily set the route to the selected image.

7. Hardware Configuration

Figure 9:
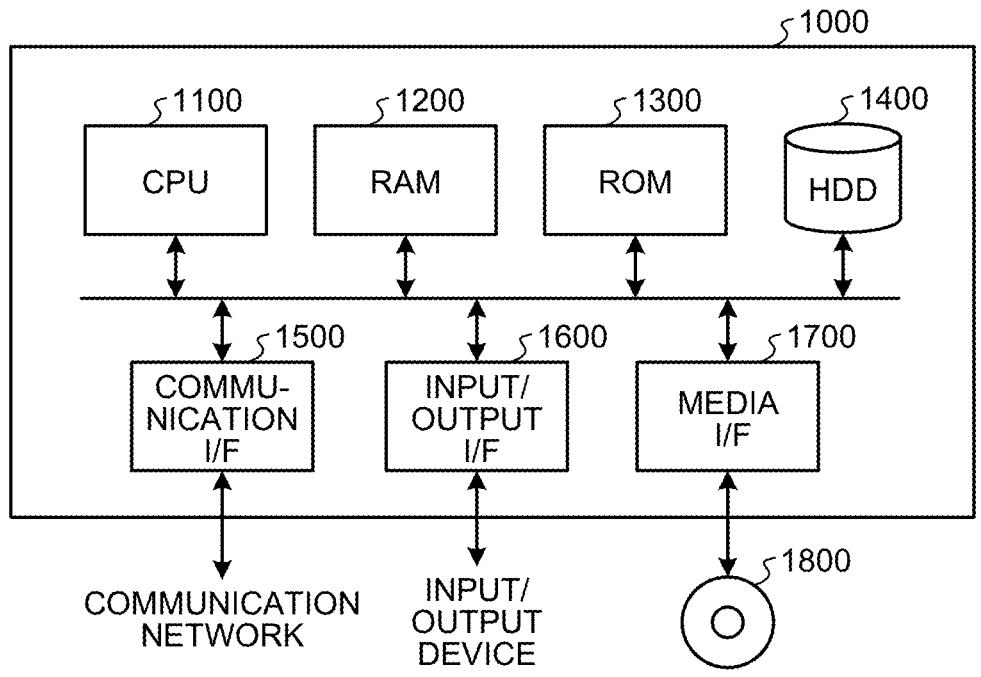
FIG. 9 is a hardware configuration diagram of an example of a computer that implements the functions of an information processing device.

The information equipment, such as the terminal device 100 and the server 200 according to the embodiment described above, is implemented by a computer 1000 having the configuration illustrated in FIG. 9, for example. FIG. 9 is a hardware configuration diagram of an example of a computer that implements the functions of the information processing device. The computer 1000 includes a CPU 1100, a RAM 1200, a ROM 1300, an HDD 1400, a communication interface (I/F) 1500, an input/output interface (I/F) 1600, and a media interface (I/F) 1700.

The CPU 1100 operates based on a computer program stored in the ROM 1300 or the HDD 1400 to control each unit. The ROM 1300 stores therein a boot program executed by the CPU 1100 at the start-up of the computer 1000, computer programs dependent on the hardware of the computer 1000, and other computer programs.

The HDD 1400 stores therein computer programs executed by the CPU 1100, data used by the computer programs, and other data. The communication interface 1500 receives data from other devices via a predetermined communication network and transmits it to the CPU 1100. The communication interface 1500 transmits data generated by the CPU 1100 to other devices via the predetermined communication network.

The CPU 1100 controls output devices, such as a display and a printer, and input devices, such as a keyboard and a mouse, via the input/output interface 1600. The CPU 1100 acquires data from the input devices via the input/output interface 1600. The CPU 1100 outputs the generated data to the output devices via the input/output interface 1600. Instead of the CPU 1100, an MPU or a graphics processing unit (GPU) may be used because a great computing power is required.

The media interface 1700 reads a computer program or data stored in a recording medium 1800 and supplies it to the CPU 1100 via the RAM 1200. The CPU 1100 loads the computer program from the recording medium 1800 via the media interface 1700 onto the RAM 1200 and executes the loaded computer program. The recording medium 1800 is an optical recording medium, such as a digital versatile disc (DVD) and a phase change rewritable disk (PD), a magneto-optical recording medium, such as a magneto-optical disk (MO), a tape medium, a magnetic recording medium, or a semiconductor memory, for example.

When the computer 1000 functions as the terminal device 100, for example, the CPU 1100 of the computer 1000 executes the computer program loaded on the RAM 1200, thereby implementing the functions of the control unit 130. While the CPU 1100 of the computer 1000 reads and executes these computer programs from the recording medium 1800, it may acquire these computer programs from other devices via a predetermined communication network.

While some of the embodiments according to the present application have been described in detail with reference to the drawings, they are given by way of example only. The present invention can be embodied in other aspects with various modifications and improvements made based on the knowledge of those skilled in the art, besides the aspects described in the disclosure of the invention.

8. Others

Out of the processing described in the embodiments and the modifications above, some or all of the pieces of the processing described as being performed automatically can be performed manually. Alternatively, some or all of the pieces of the processing described as being performed manually can be performed automatically by known methods. In addition, the processing steps, the specific names, and the information including various data and parameters described in the description above and the drawings can be optionally changed unless otherwise noted. For example, the various kinds of information illustrated in the figures are not limited to the information illustrated in the figures.

The components of the devices illustrated in the figures are functionally conceptual components and are not necessarily physically configured as illustrated in the figures. In other words, the specific aspects of distribution and integration of the devices are not limited to those illustrated in the figures. Some or all of the devices may be functionally or physically distributed or integrated in any desired units depending on various loads and states of use, for example.

The embodiments and the modifications described above can be appropriately combined as long as they do not contradict the processing contents.

REFERENCE SIGNS LIST

1 information processing system
100 terminal device
101 display operating unit
102 positioning unit
110 communication unit
120 storage unit
130 control unit
131 acquiring unit
132 display control unit
133 setting unit
200 server
210 communication unit
220 storage unit
221 map information storage unit
230 control unit
231 management unit
N network

The invention claimed is:

1. An information processing device comprising one or more memory devices having a program stored therein that, when executed by one or more processors, causes the one or more processors to:
   acquire a present position of a movable object; and
   display an image, among a plurality of images, posted in a manner associated with position information in a map of a predetermined area including the present position based on the present position and priority according to accessibility from the present position, wherein the one or more processors are configured to:
   in response to the movable object being in motion, display each image of the plurality of images one by one; and in response to the movable object being stopped, display the plurality of images in a tile display.

2. The information processing device according to claim 1, wherein the predetermined area is an area of a map being displayed or an area of a map to be displayed after the movable object starts to move.

3. The information processing device according to claim 1, wherein the one or more processors are configured to: display the image associated with the position information in a specific range in a traveling direction of the movable object as an image, the priority of which is high.

4. The information processing device according to claim 1, wherein the one or more processors are configured to: assign a higher priority to the image with fewer right and left turns on a route from the present position to a position indicated by the position information associated with the image than to other images associated with routes having a greater number of right and left turns.

5. The information processing device according to claim 4, wherein the one or more processors are configured to: display the image with fewer right turns than left turns on the route as an image, the priority of which is high.

6. The information processing device according to claim 1, wherein the one or more processors are configured to: display the image with late posting date and time as an image, the priority of which is high.

7. The information processing device according to claim 1, wherein the one or more processors are configured to: display, when a route from the present position to a destination is set, the image in order of proximity to the route to the destination as an image, the priority of which is high.

8. The information processing device according to claim 7, wherein the one or more processors are configured to: display the image associated with the position information corresponding to a detour from the route to the destination by lowering the priority of the image.

9. The information processing device according to claim 1, wherein the movable object is a vehicle, and the one or more processors are configured to display, when an operator is not a driver of the vehicle, the images in the tile display when the vehicle is moving.

10. The information processing device according to claim 1, wherein the one or more processors are configured to: display the images in the tile display in descending order of the priority from a top.

11. The information processing device according to claim 10, wherein the one or more processors are configured to: lower the priority of the image associated with the position information in a direction opposite to a traveling direction of the movable object and display the image so as to move the image to a bottom in the tile display.

12. The information processing device according to claim 10, wherein the one or more processors are configured to: change the images displayed in the tile display according to the present position of the movable object.

13. The information processing device according to claim 1, wherein the one or more processors are configured to: set an indicator of the present position at a center of a grid of the images arranged in the tile display and display the images from the center outward in descending order of the priority.

14. The information processing device according to claim 1, wherein the one or more processors are configured to vary, when displaying a map of the predetermined area, a mark representing a position indicated by the position information associated with the image according to the priority.

15. The information processing device according to claim 1, wherein the one or more processors are configured to: display, when the displayed image is selected, a map of an area including the present position, and set a route from the present position to a position indicated by the position information associated with the selected image on the displayed map.

16. An information processing method performed by an information processing device, the information processing method comprising:

acquiring a present position of a movable object; and displaying an image, among a plurality of images, posted in a manner associated with position information in a map of a predetermined area including the present position based on the present position and priority according to accessibility from the present position, wherein displaying the image includes:

in response to the movable object being in motion, displaying each image of the plurality of images one by one; and in response to the movable object being stopped, displaying the plurality of images in a tile display.

17. A non-transitory computer-readable storage medium having stored therein an information processing program that causes a computer to execute a process comprising:

acquiring a present position of a movable object; and displaying an image, among a plurality of images, posted in a manner associated with position information in a map of a predetermined area including the present position based on the present position and priority according to accessibility from the present position, wherein displaying the image includes:

in response to the movable object being in motion, displaying each image of the plurality of images one by one; and in response to the movable object being stopped, displaying the plurality of images in a tile display.

* * * * *